(12) United States Patent
Lin

(10) Patent No.: US 6,674,914 B1
(45) Date of Patent: Jan. 6, 2004

(54) EXPANDABLE GRAYSCALE MORPHOLOGICAL EROSION OPERATOR

(75) Inventor: Reitseng Lin, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/400,381

(22) Filed: Sep. 21, 1999

(51) Int. Cl.[7] ................................. G06K 9/42
(52) U.S. Cl. ..................................... 382/257
(58) Field of Search .................. 382/254, 256–259, 382/276, 302; 358/1.2

(56) References Cited

U.S. PATENT DOCUMENTS

| | | | | |
|---|---|---|---|---|
| 4,641,356 A | * | 2/1987 | Sternberg | 382/257 |
| 5,579,445 A | * | 11/1996 | Loce et al. | 358/1.2 |
| 5,627,908 A | * | 5/1997 | Lee et al. | 382/133 |
| 6,148,114 A | * | 11/2000 | Han | 382/256 |
| 6,175,655 B1 | * | 1/2001 | George, III et al. | 382/257 |

* cited by examiner

Primary Examiner—Jose L. Couso (57) ABSTRACT

A grayscale morphological erosion operator image processor which operates on images of any size and dimension with a structuring element of any dimension and shape. The present invention performs all 1D erosion operations in the domain by first decomposing an image and structuring element into a series of 1D slices, and then further segmenting the structuring element into a plurality of shorter 1D segments. These segments are processed in parallel using an array of parallel processors. Once the erosion operations are complete, the resulting one dimensional slices are composed into a final eroded image.

15 Claims, 6 Drawing Sheets

| Slice of Structure Element $k_j$ | Eroded Image $g_i$ | | | | | | | |
|---|---|---|---|---|---|---|---|---|
| | $g0$ | $g1$ | $g2$ | $g3$ | $g4$ | $g5$ | $g6$ | $g7$ |
| | Slice of Image $f_i$ | | | | | | | |
| $k0$ | f0 | f1 | f2 | f3 | f4 | f5 | f6 | f7 |
| $k1$ | f1 | f2 | f3 | f4 | f5 | f6 | f7 | f8 |
| $k2$ | f2 | f3 | f4 | f5 | f6 | f7 | f8 | f9 |
| $k3$ | f3 | f4 | f5 | f6 | f7 | f8 | f9 | f10 |
| $k4$ | f4 | f5 | f6 | f7 | f8 | f9 | f10 | f11 |
| $k5$ | f5 | f6 | f7 | f8 | f9 | f10 | f11 | f12 |

EXPANDABLE GRAYSCALE MORPHOLOGICAL EROSION OPERATOR

FIELD OF THE INVENTION

The present invention relates to the field of image processing systems, and more particularly to a digital system and method for grayscale morphological image processing.

BACKGROUND OF THE INVENTION

Conventional image processing systems are used in a variety of applications, including automatic object recognition systems which allow computers to identity particular objects or patterns in an image, as well as systems which enhance an image to make particular objects or patterns in the image more easily recognizable. Such systems typically operate by acquiring and digitizing an image into a matrix of pixels.

In non-grayscale, or binary, images each pixel is encoded in a single bit which is set to zero if the pixel is dark, or set to one if the pixel is illuminated. In grayscale images, each pixel is encoded in a multi-bit word which is set to a value corresponding to the illumination intensity of the pixel. The image processor scans the digital image and processes the digital information to interpret the image.

One class of image processing systems is based on mathematical morphology, the science of processing and analyzing digital images through mathematical set transformations. Binary morphological processing was first investigated in the 1970s. See G. Matheron, *Random Sets and Integral Geometry*, Wiley, New York, 1975. Thereafter, the process was extended to grayscale morphology. See S. R. Steinberg, "Grayscale Morphology", *Computer Vision, Graphics, and Image Processing*, vol. 35, pp. 333–355, 1986.

Morphological image processing techniques can be expressed in terms of two basic transformation operations: dilation and erosion. The dilation operation propagates pixel states representative of relatively high intensities throughout some region of an image, while the erosion operation contracts regions of relatively high intensity in an image.

Morphological image processing operates by using the geometric information of an image which is exactly specified in an image probe, also called a structuring element. Using this known geometrical information, particular features in the image can be extracted, suppressed, or preserved by applying morphological operators. Structuring elements can be constructed in one or more dimensions. Examples of common three-dimensional (3D) structuring elements include spheres, cones, bars, cylinders, parabaloids, and polyhedrons.

However, morphological dilation and erosion operations suffer from a significant drawback. Specifically, they can be very computationally time-consuming depending on the size of the structuring element used. See, for example, Cytocomputer described in A. P. Reeves, "Survey: Parallel Computer Architectures for Image Processing", *Computer Vision, Graphics, and Image Processing*, vol. 25, pp. 68–88, 1984; and the Diff3 Analyzer described in M. D. Graham and P. E. Norgren, "The Diff3 Analyzer: a Parallel/Serial Golay Image Processor", *Real-Time Medical Image Processing*, M. Onoe et al. eds., pp. 163, Plenum Press, New York, 1980. Other examples include the algorithms for decomposing a large two-dimensional (2D) structuring element described in, J. Xu, "Decomposition of Convex Polygonal Morphological Structuring Elements into Neighborhood Subsets," *IEEE Trans. Pattern Analysis and Machine Intelligence*, vol. 13, no. 2, 153–162, February 1991.

SUMMARY OF THE INVENTION

A grayscale morphological image processor which performs morphological erosion operations on an input image of any dimension by using a one-dimensional (1D) operator that constructs a structuring element of any size and shape. Using translation invariance, the input image and structuring element are first decomposed until they are in the 1D domain. The 1D structuring element is then spatially decomposed into smaller segments which operate in parallel to transform the input image. Structuring elements of any size and shape can be composed to perform the parallel erosion operations on an image of any dimension. Processing multiple 1D operations in parallel using the present invention significantly reduces processing time as compared to conventional systems.

DETAILED DESCRIPTION OF THE DRAWINGS

The following detailed description relates to a grayscale morphological image processor and a method for performing the same. Images of any size or dimension can be processed using the present invention.

Figure 1:
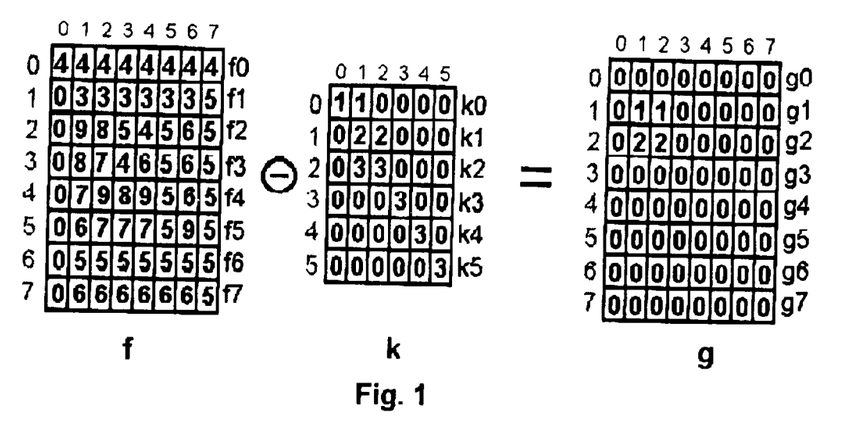
FIG. 1 shows an example of a conventional 2D grayscale erosion operation performed on a 2D image in accordance with the prior art.

FIG. 1 shows a conventional grayscale erosion operation performed on 2D image f which has 8×8 pixels. The structuring element k is also shown in FIG. 1 and contains grayscale data points arranged in a predetermined desired geometrical pattern chosen to facilitate the extraction of particular features of image f. In the erosion operation, denoted by the symbol ⊖, the structuring element k operates on image f to produce resulting eroded image g which is also shown in FIG. 1.

Mathematical morphological techniques, which are based on mathematical set theory, are used to perform this erosion operation. Using these techniques, if we define image f as the function f:F→E and define structuring element k as the function k:K→E, where E is a set in Euclidean N-space, F and K are subsets of the set of all points in E, the erosion operation can be computed as follows:

$$(f \ominus k)(x) = \min\{f(x+z) - k(z)\} \text{ for } z \in K \text{ and } x+z \in F \quad (1)$$

The erosion of a 3D image f by a 3D structuring element k can also be computed in the 2D domain as follows:

$$g_i = \min(f_{i+j} \ominus k_j) \quad (2)$$

where $g_i$, $f_i$ and $k_j$, are 2D slices of the dilated 3D image g, the 3D image f, and the 3D structuring element k, respectively. This equation can be applied to a multi-dimensional image and successive applications of the equation eventually reduce the operation to the 1D domain. Once the 1D domain is reached, the 1D structuring element $k_j$ can be further spatially decomposed into smaller segments. If structuring element k is shifted in a particular direction, eroded image g is shifted the same amount in the same direction as follows:

$$f \ominus (k)_x = (f \ominus k) - x \quad (3)$$

If $k_j$ is segmented into n segments and each segment is denoted as $k_{jl}$, then $$k_j = \min_{l=0}^{l-1} k_{jl}$$

and $$g_i = \min_j\{f_{i+j} \ominus k_j\} = \min_j\{f_{i+j} \ominus \min_l k_{jl}\} = \min_j\{\min_l(f_{i+j} \ominus k_{jl})\} \quad (4)$$

Although a fixed size is preferred for all segments, the size of one segment may be different from that of another.

Assuming that the distance to the origin for each $k_{jl}$ is 1, and assuming that the starting position of each $k_{jl}$ is its origin, the coordinate of each structuring element segment is shifted to the right for 1 positions. For purposes of convenience, the same symbol $k_{jl}$ will be used for the shifted structuring element segment, and Equation (4) will be modified as follows:

$$g_i = \min_j\{\min_l\{f_{i-1} \ominus k_{jl}\}\}_{-1} \quad (5)$$

Equation (5) shows that any size-structuring element can be composed by selecting a set of $k_{jl}$.

Figure 2A:
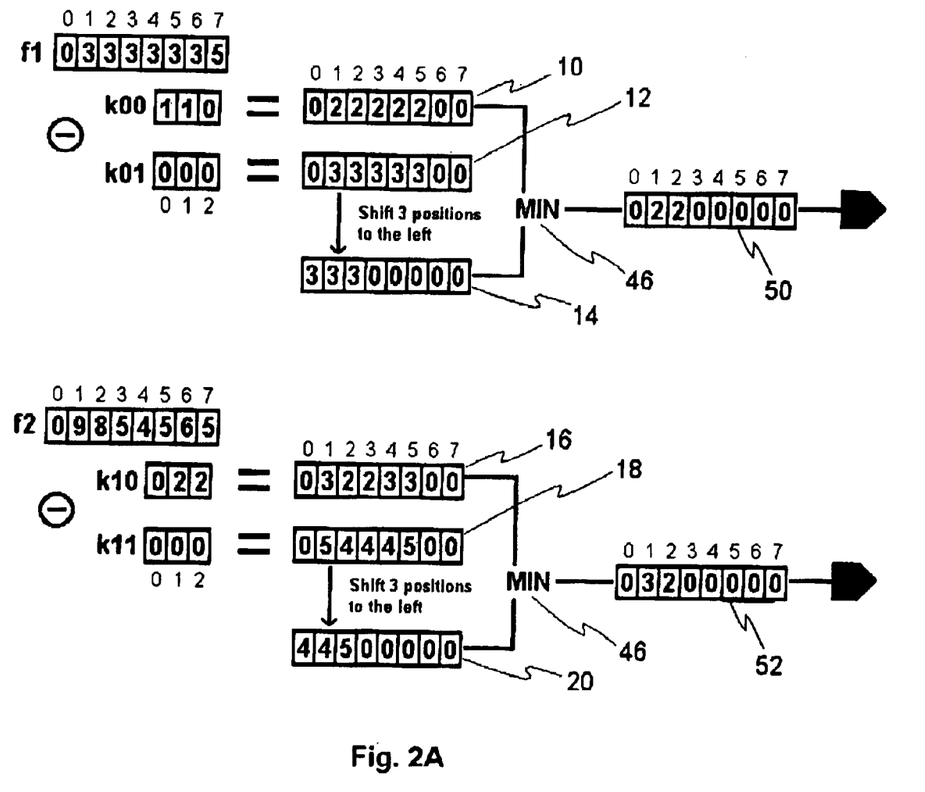
FIGS. 2A–2B show a series of steps of a grayscale erosion operation performed in accordance with the present invention in which the operation is performed using segmented structuring elements of equal size which operate in parallel.
Figure 2B:
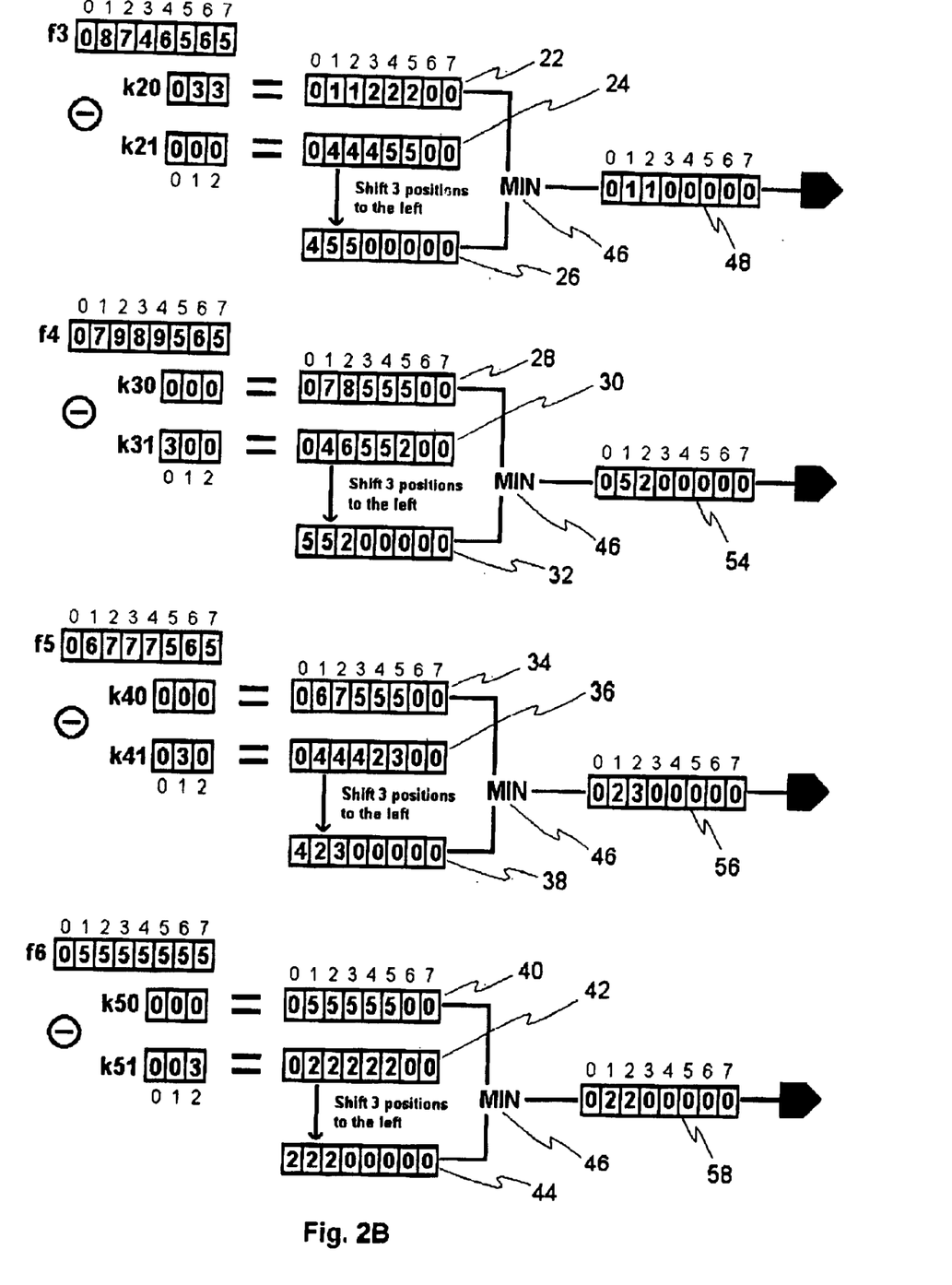
Figure 2C:
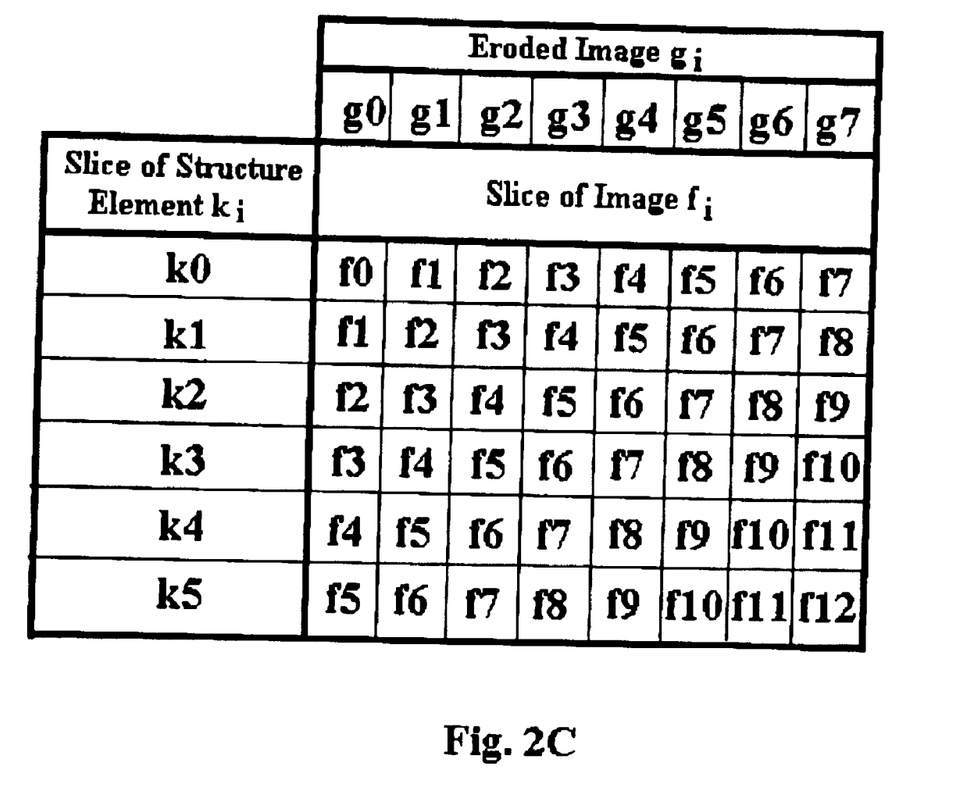
FIG. 2C is a table showing the mapping of image slices to structural element slices for the grayscale erosion operation shown in FIG. 2A.
Figure 3:
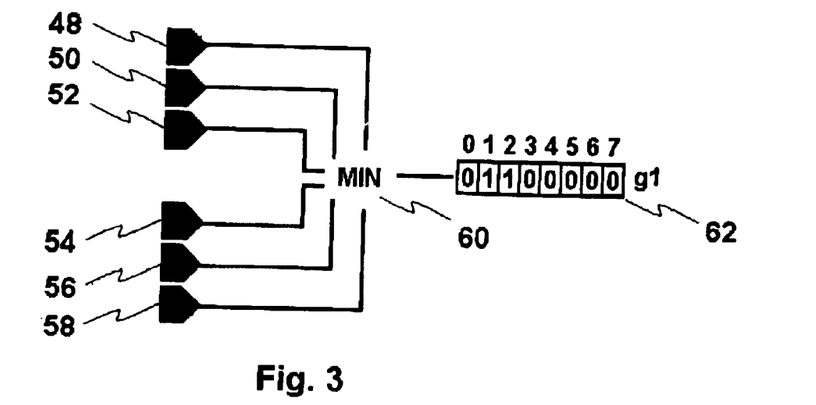
FIG. 3 shows a final step of the 2D grayscale erosion operation shown in FIG. 1.

FIGS. 2A, 2B and 3 show the steps for performing a grayscale erosion operation according to the present invention in which the operation is performed using segmented structuring elements of equal size which operate in parallel. In order to obtain the eroded image g, the slices of the eight slices labeled g0, g1, g2, g3, g4, g5, g6 and g7 which comprise this image must each be translated by operating on image f with structuring element k. In the example shown in FIGS. 2A, 2B and 3, the upper and lower bounds of structuring element k exclude slices f0 and f7, thereby limiting the region operated on by structuring element k to the six slices f1 through f6.

As shown in FIGS. 2A, 2B, 2C, and 3, slice g1 is the first slice of eroded image g to be determined by operating on the f1 slice of image f with slice k0 of structuring element k. To complete the construction of the g1 slice, slice f0 is operated on by slice k1, slice f1 is operated on by slice k2, slice f2 is operated on by slice k3, slice f3 is operated on by slice k4, and slice f4 is operated on by slice k5. The mapping of structuring element k slices to image f slices to determine the slices of eroded image g is shown in table form in FIG. 2C.

To both improve the speed of the erosion operation and to decrease the complexity of the computations involved, the present invention divides the erosion operation into smaller operations which are performed in parallel. As shown in FIG. 2A, this is accomplished by dividing each slice of structuring element k into two segments which operate in parallel thereby resulting in a processing speed which is faster than can be attained using a single larger computational operation. For example, structuring element slice k0 is split into two equal segments of three pixels each labeled k00 and k01, respectively, which then operate on slice f1 yielding the results shown in slices 10 and 12. This parallel operation enables resultant erosion slices g0–g7 to be generated simultaneously. Alternatively, structuring element k can be segmented into more than two segments.

The location of an intermediate pixel produced using the present invention is computed as the difference of the location of a particular pixel in image f and the location of a particular pixel in structuring element k that operates on that particular pixel in image f. The grayscale value of the intermediate pixel so produced is computed as the difference in the grayscale value of the pixels in image f and in structuring element k and is bounded at 0. For example, in FIG. 2A, the image pixel at location 0 in f1 has a grayscale value of 0. When it is operated on by the structuring element pixel at location 0 in k00 which has a grayscale value of 1, it generates an intermediate image pixel at location 0 of slice 10 having a grayscale value of −1, which is less than 0, and thus becomes 0. Similarly, when the image pixel at location 0 in f1 is operated on by the structuring element pixel at location 1 in k00 having a grayscale value of 1, it generates an intermediate image pixel at location −1 of slice 10 having a grayscale value of −1, thus 0. Likewise, when the image pixel at location 0 in f1 is operated on by structuring element pixel at location 2 in k00 having a grayscale value of 0, it generates an intermediate image pixel at location −2 of slice 10 having a grayscale value of 0. This process is then repeated by having k00 operate on the remaining seven pixels in locations 1 through 7 of f1.

In this manner, each pixel in f1 will produce three pixels for each location in slice 10 when operated on by the three pixel structuring element segment k00. The resulting grayscale value of a pixel at each one of these locations will be the minimum value of the pixels generated at that location. For example, the first pixel produced at location 3 in image slice 10 from the operation of the pixel at location 0 of structuring element segment k00 on the pixel at location 3 of image slice f1 has a grayscale value of 2, i.e., 3−1. The second pixel produced at location 3 of slice 10 from the operation of the pixel at location 1 of structuring element segment k00 on the pixel at location 4 of image slice f1 has a grayscale value of 2, i.e., 3−1. The third and final pixel produced at location 3 of slice 10 from the operation of the pixel at location 2 of structuring element segment k20 on the pixel at location 5 of image slice f1 has a grayscale value of 3, i.e., 3−0. Accordingly, the grayscale value of pixel at location 3 of slice 10 is 2, the minimum value of the three pixels produced at that location.

While structuring element segment k00 operates on f1 to produce slice 10, structuring element segment k01 also operates on f1 in the same exact manner as described above to produce slice 12. The result in slice 12 is then shifted three positions employing Equation (6) to produce shifted slice 14. Slices 10 and 14 are then processed through a minimum operation 46 to yield the resultant image slice 48 which contains the smallest grayscale value for each pixel location. The operations just described are also performed on image slices f2, f3, f4, f5, and f6. Each of these operations can be performed in parallel.

When all of the image slices f1–f6 have been translated as described above, resulting image slices 48, 50, 52, 54, 56 and 58 are generated. As shown in FIG. 3, minimum operation 60 then performs a minimum operation to determine the minimum grayscale value for each pixel location. The result is final eroded image slice g1.

The grayscale value for each pixel location in the eroded image slice resulting from the minimum operation is the grayscale value having the lowest numerical value in the corresponding location in the slices of the resultant image f slices 48, 50, 52, 54, 56 and 58 processed by minimum operator 60. For example, the lowest grayscale value of the pixels in location 1 of image slices 48, 50, 52, 54, 56, and 58 is 1. Accordingly, location 1 of eroded image slice g1 has a grayscale value of 1. The steps described above are repeated for all the other slices in image f using appropriate structuring elements k as mapped in FIG. 2C to obtain eroded image slices g0–g7 shown in FIG. 1.

Figure 4:
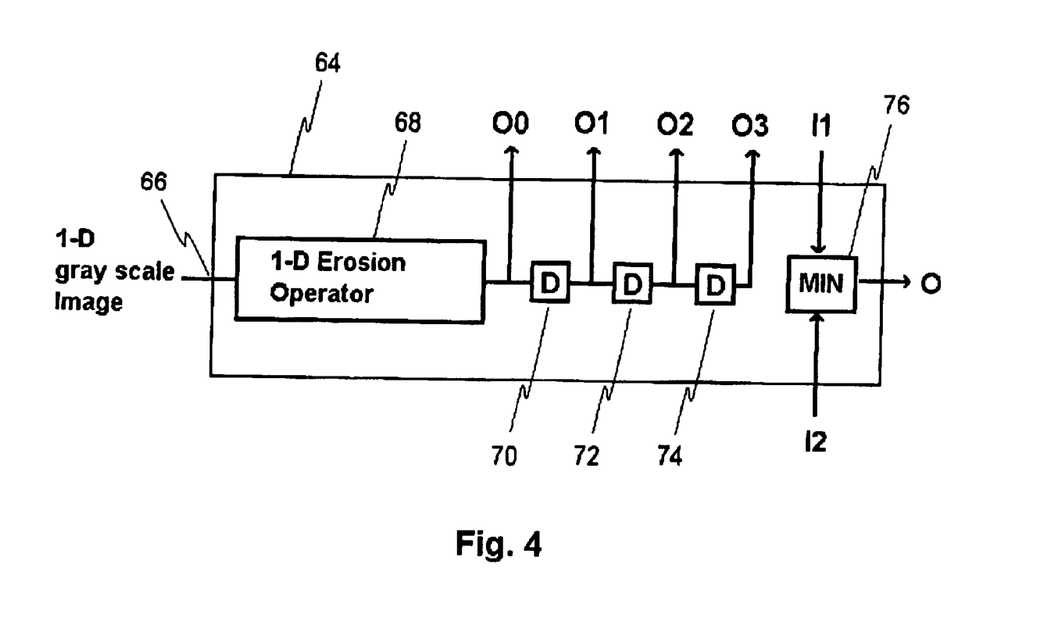
FIG. 4 shows a first embodiment of an erosion operator for implementing the present invention utilizing a 3×1 expandable erosion operator.

FIG. 4 shows a first embodiment of an erosion operator for implementing the present invention in which expandable 3×1 erosion operator 64 determines the erosion of individual 1D slices of image f by employing a single three pixel segment of a 1D structuring element slice, such as k0.

Figure 5:
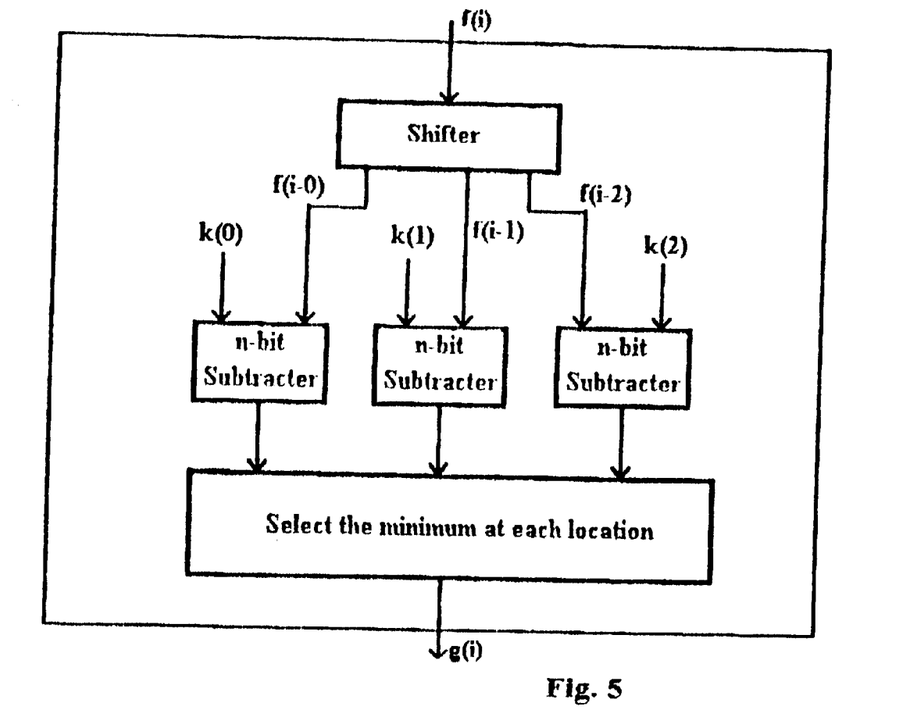
FIG. 5 shows a simplified embodiment of the processing unit used in the 3×1 expandable erosion operator shown in FIG. 4.

Erosion operator 64 includes an input port 66, which receives a one dimensional slice of the image to be processed. The erosion operator 64 performs the above-described functions. Processing unit 68 can be simplified as shown in FIG. 5. As shown in FIG. 4, blocks 70, 72, and 74 are delay elements which store a signal at their input lines for a certain period of time before transmitting the signal to their respective output lines. In the present invention, the delay time is the time required to generate the next eroded pixel by the non-expandable 3×1 erosion operation. Thus, if the output from the non-expandable operator is g(i), then the output at output lead O0 is g(i), at output lead O1 is g(i−1), and at output lead O2 is g(i−2). Minimum operator 76 then selects the smaller of the two inputs, I1 or I2, and transfers the selected input to output lead O.

Figure 6:
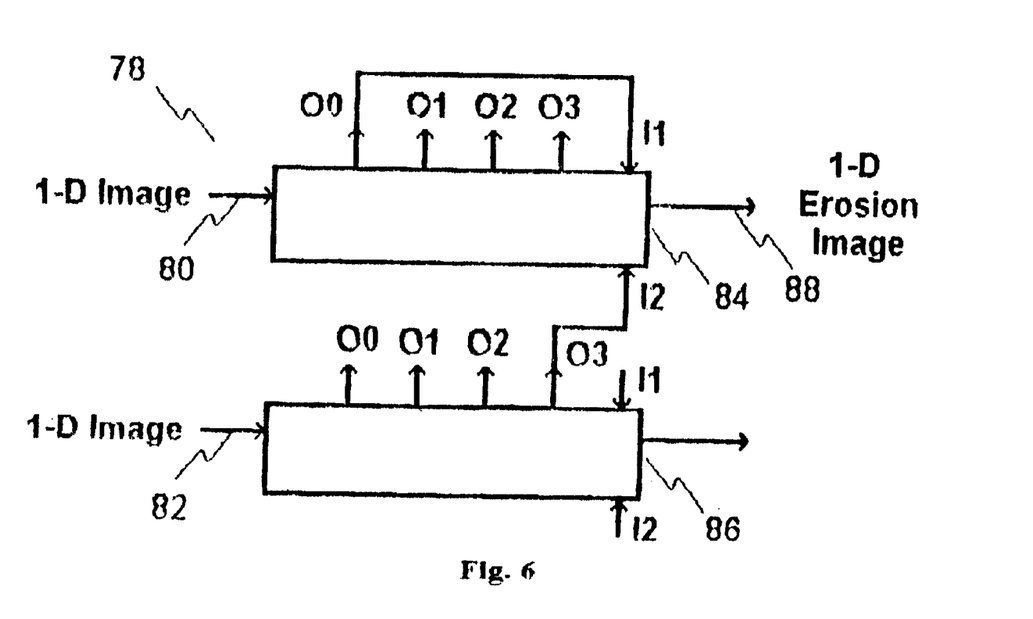
FIG. 6 shows a second embodiment of an erosion operator for implementing the present invention utilizing a 6×1 erosion operator composed of two of the 3×1 erosion operators shown in FIG. 4.

FIG. 6 shows a second embodiment of an erosion operator for implementing the present invention in which a pair of 3×1 erosion operators 64 shown in FIG. 4 are coupled together to form 6×1 erosion operator 78. Image slice f6 is input at ports 80 and 82. Expandable erosion operators 84 and 86 are configured to perform the k00 and k01 structuring element segment operations, respectively. The output of the expandable erosion operator 86 consists of shifted result 14 shown in FIG. 2A, which is output to the I2 input of the expandable erosion operator 84. The result of the k00 operation 10 shown in FIG. 2A, is on output O0 which is coupled to input I1. Both inputs I1 and I2 are coupled to minimum operator 76 shown in FIG. 4, and the output 88 from minimum operator 76 corresponds to erosion output 50 in FIG. 2A.

Figure 7:
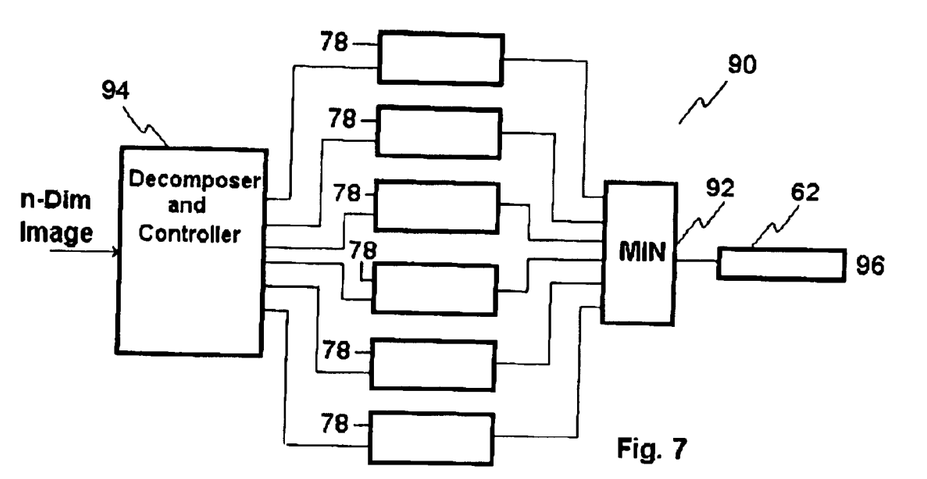
FIG. 7 shows a third embodiment of an erosion operator for implementing the present invention.

FIG. 7 shows a third embodiment of an erosion operator for implementing the present invention in which erosion operator 90 performs the erosion operation shown in FIG. 2A. Six separate 6×1 erosion operators 78 shown in FIG. 5 are coupled in parallel to minimum operator 92. Decomposer and controller unit 91 receives the image and decomposes it into 1D slices. Minimum operator 92 performs the same function as minimum operator 60 shown in FIG. 3. Specifically, it receives the six 8×1 erosion outputs which correspond to the six erosion outputs 48, 50, 52, 54, 56 and 58 shown in FIG. 2A to produce a one dimensional slice 62 of the final eroded image g6 shown in FIG. 3.

Figure 8:
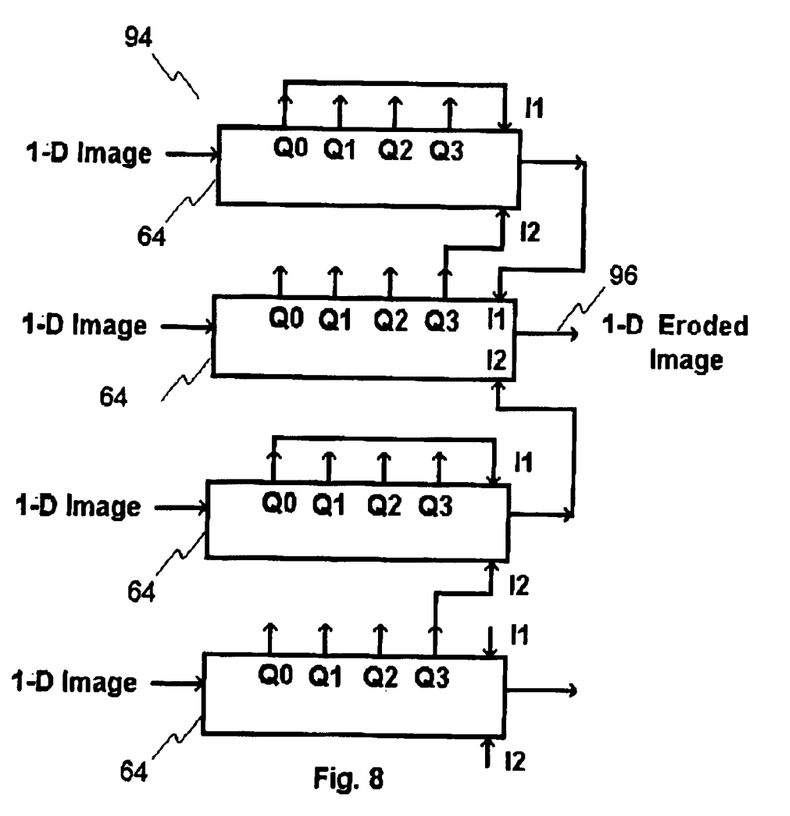
FIG. 8 shows a fourth embodiment of an erosion operator for implementing the present invention utilizing a 6×2 erosion operator composed of four of the 3×1 erosion operators shown in FIG. 4.

FIG. 8 shows a fourth embodiment of an erosion operator according to the present invention which a 6×2 erosion operator 94 comprised of four expandable 3×1 erosion operators 78 shown in FIG. 4 are coupled in parallel to generate a single output 96.

By composing appropriate combinations of the basic expandable erosion operator 64, the present invention can process images without regard to their size or dimensionality by using structuring elements of any size and dimension. Image and structuring elements having more than two dimensions, must first be split into individual 1D slices as described above in order to be processed using the present invention. Since images and structuring elements of any size and dimension can be deconstructed into a combination of 1D slices which can be processed by a combination of erosion operators 64, and since short 1D segments of structuring elements involve relatively simple computations, erosion operator 64 operates relatively quickly using relatively inexpensive components, thereby making it more feasible to employ multiple erosion operators 64 which work together in parallel. This results in a significant improvement in processing speed for many applications, particularly those involving large and complex images and structuring elements. Various conventional techniques may be used to implement the present invention such as software, or alternatively conventional Application Specific Integrated Circuits (ASICs).

Erosion operators other than those shown can be implemented using the teachings of the present invention. Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all the modifications, which come within the scope of the appended claims, is reserved.

What is claimed is:

1. A method for producing an N-dimensional eroded grayscale image, comprising the steps of:
    (a) defining an N-dimensional structuring element for an N-dimensional uneroded image, wherein both the structuring element and the image are comprised of a plurality of grayscale pixels;
    (b) decomposing both the N-dimensional structuring element and the uneroded image into a plurality of one-dimensional slices of pixels;
    (c) segmenting each one of the plurality of one-dimensional slices of the structuring element into at least two segments;
    (d) producing a plurality of one-dimensional slices of an eroded grayscale image by operating on selected ones of the plurality of one-dimensional slices of the uneroded image with the plurality of one-dimensional slices of the structuring element;
    (e) combining the plurality of one-dimensional slices of the uneroded image to attain an N-dimensional eroded grayscale image of the uneroded image, wherein the at least two segments of each one of the plurality of one-dimensional slices of the structuring element operate in parallel to reducing the computational complexity of the erosion operation and to increase the speed of the erosion operation.

2. The method according to claim 1, further comprising the step of:

(f) performing a minimum operation on the result of the parallel operation of the at least two segments of each one of the plurality of one-dimensional slices of the structuring element to produce the plurality one-dimensional eroded slices of the uneroded image, wherein each pixel in each different pixel location of the plurality one-dimensional eroded slices of the uneroded image is selected to have the smallest grayscale value of all of the possible pixels available to fill each different pixel location.

3. A method for producing an N-dimensional eroded image from an N-dimensional uneroded image, comprising the steps of:

(a) defining an N-dimensional structuring element for an N-dimensional uneroded image, wherein both the structuring element and the uneroded image are comprised of a plurality of grayscale pixels;

(b) decomposing both the N-dimensional structuring element and the N-dimensional uneroded image into a plurality of one-dimensional slices of pixels;

(c) segmenting each one of the plurality of one-dimensional slices of the structuring element into at least two segments;

(d) employing the at least two segments of a first one of the plurality of one-dimensional slices of the structuring element to operate in parallel on a first one of the plurality of one-dimensional slices of the uneroded image;

(e) shifting the result of the parallel operation of one of the at least two segments of the first one of the plurality of one-dimensional slices or the structuring element;

(f) performing a first minimum operation on the shifted result to generate a plurality of one-dimensional erosion arrays, wherein each one of the different pixel locations in the plurality of one-dimensional erosion arrays is comprised of a pixel having the smallest grayscale value of all of the possible pixels available to fill each one or the different pixel locations; and (g) performing a second minimum operation on the plurality of one-dimensional erosion arrays to generate a single one-dimensional slice of the erosion of the N-dimensional uneroded image, wherein each one of the different pixel locations in the single one-dimensional slice of the erosion of the N-dimensional uneroded image is comprised of a pixel having the smallest grayscale value of all of the possible pixels available to fill each one of the different pixel locations.

4. The method according to claim 3, further comprising the steps of:

repeating steps (d) through (e) for each one of the remaining one-dimensional slices of the image to generate a plurality of one-dimensional slices of the erosion of the uneroded image; and assembling each one of the plurality of one-dimensional slices of the erosion of the uneroded image into an N-dimensional eroded image.

5. The method according to claim 3, wherein each one of the at least two segments of each one of the plurality of one-dimensional slices of the structuring element are comprised of an identical number of pixels.

6. The method according to claim 3, wherein step (e) further comprises the steps of:

defining an origin corresponding to the location of a first pixel in a first one of the at least two segments of the first one of the plurality of one-dimensional slices of the structuring element; and shifting the other segments of the at least two segments of the first one of the plurality of one-dimensional slices of the structuring element by the number of pixel locations which will cause the location of the first pixel in the other segments to correspond to location of the first pixel in the first one of the at least two segments of the first one of the plurality of one-dimensional slices of the structuring element.

7. The method according to claim 3, wherein step (b) includes the step of calculating the equation $g_i \min \{(f_{i+j} \ominus k_j)\}$, wherein $g_i$, $f_i$ and $k_i$ and are the (N−1)-dimensional slices of the N-dimensional image g, the N-dimensional image f, and the N-dimensional structuring element k, respectively.

8. The method according to claim 3, wherein steps (e), (f) and (g) include the step of calculating the equation $g_i = \min\{f_{i+j} \ominus k_j\} = \min\{f_{i+j} \ominus \min(k_{jl})-1\} = \min\{\min\{\{f_{i+j} \ominus k_{jl})-1\}\}$.

9. The method according to claim 3, wherein the plurality of one dimensional slices of the structuring clement perform a translation operation on the plurality of one-dimensional slices of the uneroded image.

10. The method according to claim 9, wherein step (d) further comprises the step of determining an intermediate grayscale value for each pixel location in the eroded image by subtracting the grayscale value of each pixel location in the plurality of one-dimensional slices of the structuring element from the grayscale value of each pixel location in the plurality of one-dimensional slices of the image.

11. An image processing system for processing an image comprised of an array of grayscale pixels, comprising:

an N-dimensional structuring element comprised of an array of pixels;

a decomposing unit for decomposing both an N-dimensional image comprised of an array of grayscale pixels and the N-dimensional structuring element into a plurality of one-dimensional slices of pixels;

segmenting means for segmenting each one of the plurality of one-dimensional slices of the structuring element into at least two segments;

operating means by which a first one of the at least two segments of the plurality of one-dimensional slices of the structuring element operate in parallel on a first one of the plurality of one-dimensional slices of the image;

means for shifting the result of the operating means;

a plurality of intermediate minimum operators coupled to the operating means and to the shifting means for generating a plurality of one-dimensional erosion arrays, wherein each one of the different pixel locations in the plurality of one-dimensional erosion arrays is comprised of a pixel having the smallest grayscale value of all of the possible pixels available to fill each one of the different pixel locations; and a final minimum operator coupled to the intermediate minimum operators for generating a single one-dimensional slice of the erosion of the image, wherein each one of the different pixel locations in the single one-dimensional slice of the erosion of the uneroded image is comprised of a pixel having the smallest grayscale value of all of the possible pixels available to fill each one of the different pixel locations.

12. The system according to claim 11, further comprising means for assembling each one-dimensional slice of the erosion of the image into an N-dimensional eroded image.

13. The system according to claim 11, wherein the shifting means shifts each one of the at least two segments of the plurality of one-dimensional slices of the structuring element by the same number of pixels comprising each segment.

14. The system according to claim 11, wherein the image and the structuring element are each comprised of a two-dimensional array of grayscale pixels.

15. The system according to claim 11, wherein the operating means includes means for at least two segments of the first one of the plurality of one-dimensional slices of the structuring element to perform a translation operation on the first one of the plurality of one-dimensional slices of the image.

* * * * *